(12) United States Patent
Zimmermann et al.

(10) Patent No.: US 7,596,998 B2
(45) Date of Patent: Oct. 6, 2009

(54) LIQUID LEVEL SENSOR USING THICK FILM SUBSTRATE

(75) Inventors: Bernd D. Zimmermann, Ashland, OH (US); Tung-Sheng Yang, Mansfield, OH (US); Thomas C. Anderson, Arlington Heights, IL (US)

(73) Assignee: Therm-O-Disc, Incorporated, Mansfield, OH (US)

( * ) Notice: Subject to any disclaimer, the term of this patent is extended or adjusted under 35 U.S.C. 154(b) by 329 days.

(21) Appl. No.: 11/489,249

(22) Filed: Jul. 19, 2006

(65) Prior Publication Data

US 2008/0016960 A1 Jan. 24, 2008

(51) Int. Cl.
*G01F 23/00* (2006.01)
(52) U.S. Cl. ........................................ 73/295
(58) Field of Classification Search ............... 73/295, 73/290 R, 304 R, 304 C, 1.73, 149, 861, 73/204.11; 374/100
See application file for complete search history.

(56) References Cited

U.S. PATENT DOCUMENTS

| | | | | |
|---|---|---|---|---|
| 3,500,687 A * | 3/1970 | Smith | | 73/295 |
| 3,955,416 A * | 5/1976 | Waiwood | | 73/295 |
| 4,609,913 A * | 9/1986 | Arbogast et al. | | 340/622 |
| 4,720,997 A * | 1/1988 | Doak et al. | | 73/295 |
| 4,785,665 A * | 11/1988 | McCulloch | | 73/295 |
| 5,243,858 A * | 9/1993 | Erskine et al. | | 73/204.26 |
| 5,966,311 A * | 10/1999 | Stemporzewski et al. | | 700/281 |
| 6,098,457 A * | 8/2000 | Poole | | 73/295 |
| 6,293,145 B1 * | 9/2001 | Wallrafen | | 73/304 C |
| 6,368,734 B1 * | 4/2002 | Mihara et al. | | 428/699 |
| 6,662,650 B1 * | 12/2003 | Durkee et al. | | 73/295 |
| 7,181,965 B2 * | 2/2007 | Kearney et al. | | 73/295 |
| 2004/0101031 A1 * | 5/2004 | Kotwicki | | 374/185 |

* cited by examiner

*Primary Examiner*—Hezron Williams
*Assistant Examiner*—Gunnar J Gissel
(74) *Attorney, Agent, or Firm*—Harness, Dickey & Pierce, P.L.C.

(57) ABSTRACT

In many applications, where the level of a liquid needs to be monitored (and possibly controlled), it is not necessary to provide a continuous (analog) liquid level signal, but limit sensing to one (or two) discrete levels over a small level range. In this case, a ceramic substrate sensor with discrete thermistor/heater pairs provides necessary information to control the level of the fluid. Protection of the substrate from liquid (and potential contaminants) is accomplished by coating the surface with an inert glass ("glaze") layer and/or polymer layer (e.g., "Parylene"). Packaging of the coated substrate is accomplished by protective base, epoxy, and slosh shield. Cost can be significantly reduced over a prior art multiple thermocouple based sensor design, since discrete electronic components are avoided or reduced. Also, the number of pins, and therefore electrical connections, can be significantly reduced.

10 Claims, 14 Drawing Sheets

LIQUID LEVEL SENSOR USING THICK FILM SUBSTRATE

BACKGROUND AND SUMMARY OF THE INVENTION

The present invention relates generally to devices used to measure the level of a liquid within a vessel or container and more specifically to such a device formed of a thick film (e.g., ceramic) substrate bearing (e.g., screen printed) heaters and thermistors.

There exists a wide variety of applications in which it is desirable to monitor to some degree the level of a liquid within a vessel or the like. Such applications may range from monitoring various fluid levels within a motor vehicle or internal combustion engine or fuel tank to monitoring oil levels within a pump or compressor or even water levels within a tank such as for a recreational vehicle or boat. In each of these applications it is desirable that the liquid level sensor be capable of providing a reliable accurate indication of the liquid level over an extended period of time without requiring periodic maintenance. In many applications the level sensor must be capable of enduring various levels of vibration, heat or other hostile environmental elements as well as space limitations. Additionally, in some applications utilizing sealed vessels such as hermetic compressors, it is desirable to minimize the number of penetrations such as electrical leads through the walls of the vessel to reduce the potential for leakage.

Various types of devices have been developed over the years for sensing such levels of liquids. Such devices range from the extremely simple float arrangement commonly employed in fuel tanks to more complex electrical capacitance type sensors as well as microprocessor based thermocouple sensors. While operable, these various types of sensors have had varying drawbacks depending upon the particular application such as excessive space requirements for accommodating moveable floats and associated linkage, relatively high costs to manufacture, complexity of circuitry required to generate a level indicating signal, susceptibility to errors from extended or extraneous electrical noise, lack of resistance to hostile environmental elements, etc.

In many applications, where the level of a liquid needs to be monitored (and possibly controlled), it is not necessary to provide a continuous (analog) liquid level signal, but limit sensing to one (or two) discrete levels over a small level range. In this case, a ceramic substrate sensor with discrete thermistor/heater pairs provides necessary information to control the level of the fluid. Protection of the substrate from liquid (and potential contaminants) is accomplished by coating the surface with an inert glass ("glaze") layer and/or polymer layer (e.g., "Parylene"). Packaging of the coated substrate is accomplished by protective base, epoxy, and slosh shield. Cost can be significantly reduced over a prior art multiple thermocouple based sensor design, since discrete electronic components are avoided. Also, the number of pins, and therefore electrical connections, can be significantly reduced.

Additional advantages and features of the present invention will become apparent from the subsequent description and the appended claims taken in conjunction with the accompanying drawings.

DESCRIPTION OF THE PREFERRED EMBODIMENTS

Figure 1:
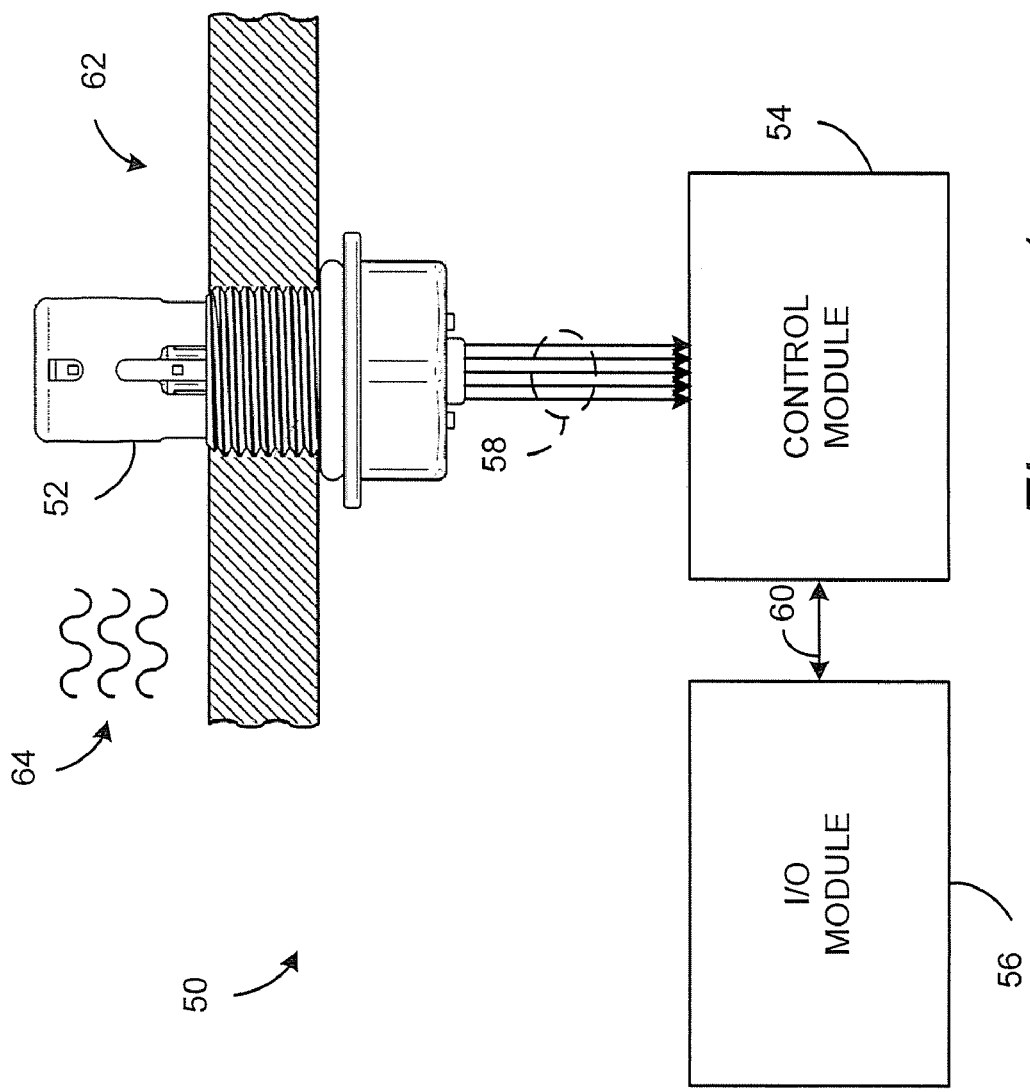
FIG. 1 is a block diagram illustrating a liquid level sensor.

Referring now to the drawings, the liquid level sensor can be formed of discrete heaters and thermistors that are screen-printed onto a ceramic ($Al_2O_3$) substrate, such that uniform heating is accomplished on its surface. Since the ceramic material is very thermally conductive, localized fluid temperature monitoring (and compensation) may not be possible. Therefore, fluid temperature is monitored at a location on the substrate which is always immersed in the fluid (such as at the bottom of a reservoir), and interpreted as being representative of average ambient temperature.

FIG. 1 generally depicts the major components of a liquid level sensor. The sensor 50 generally includes a probe 52 coupled with a control module 54. An I/O module can also be included in the sensor 50. As used in the description, the term module refers to an application specific integrated circuit (ASIC), an electronic circuit, a processor (shared, dedicated, or group) and memory that execute one or more software or firmware programs, a combinatorial logic circuit, and/or other suitable components that provide the described functionality.

The probe 52 has no moving parts. The probe 52 is typically disposed in a fluid environment 62 for detecting level of a liquid 64. When it is subjected to presence of the fluid 64, the probe 52 experiences changes in its condition represented by signal 58 (i.e., a voltage).

The signal 58 from the probe 52 is continuously monitored by the control module 54. The control module 54 processes the signal 58, and generates an output 60 that is indicative of a fluid level. The I/O module 56 provides a means by which the sensor 50 can communicate its output 60 to other device (s) or a user.

It is presently contemplated that the liquid level sensor 50 can be employed in a household appliance, such as a washing machine, to monitor liquid level in a clothes washing or dishwashing container.

Figure 2:
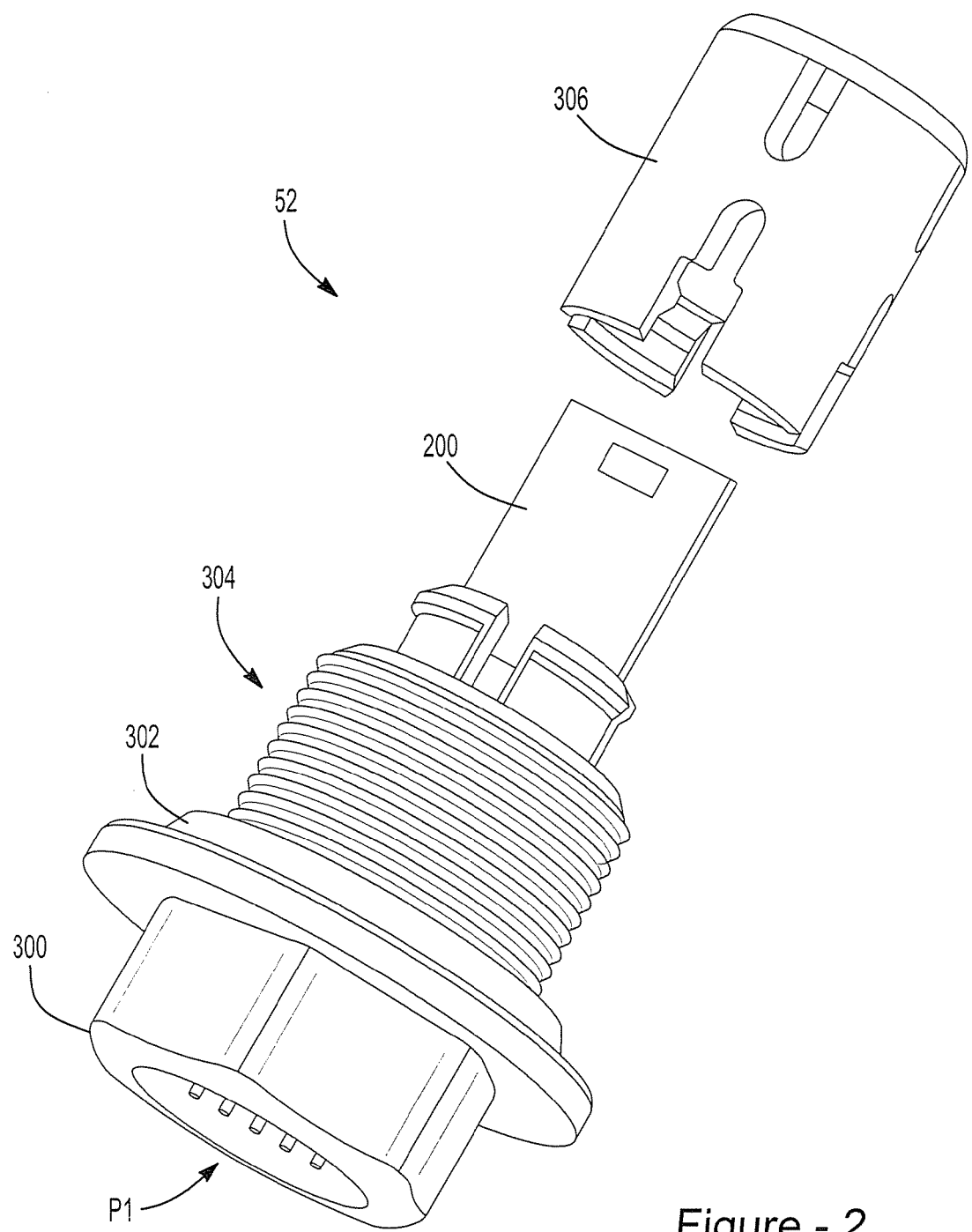
FIG. 2 is an exploded perspective view illustrating a liquid level sensor probe.

One embodiment of the probe 52 for use in the sensor 50 is shown in FIG. 2. The probe 52 generally comprises a circuit board formed of a ceramic substrate 200 and connector assembly having interconnect P1, both of which are inserted in a switch case formed of a polygonal base 300 and a cap 306. The base 300 has threads 304, and an o-ring 302 for facilitating installation in the bottom of a liquid container without causing a leak in the container. The circuit board and connector assembly is housed at one end in the switch case. The cap 306 covers the opposite end of the circuit board and connector assembly. Cap 306 serves as a protective shield for preventing sloshing fluid from causing inaccurate liquid level readings. Additionally, cap 306 prevents damage to the ceramic substrate during installation and operation. The ceramic substrate 200 of the circuit board and connector assembly can either be insert-molded into the probe base 300, or potted using epoxy. The base 300 has one or more holes through which pins of interconnect P1 are exposed.

Figure 3:
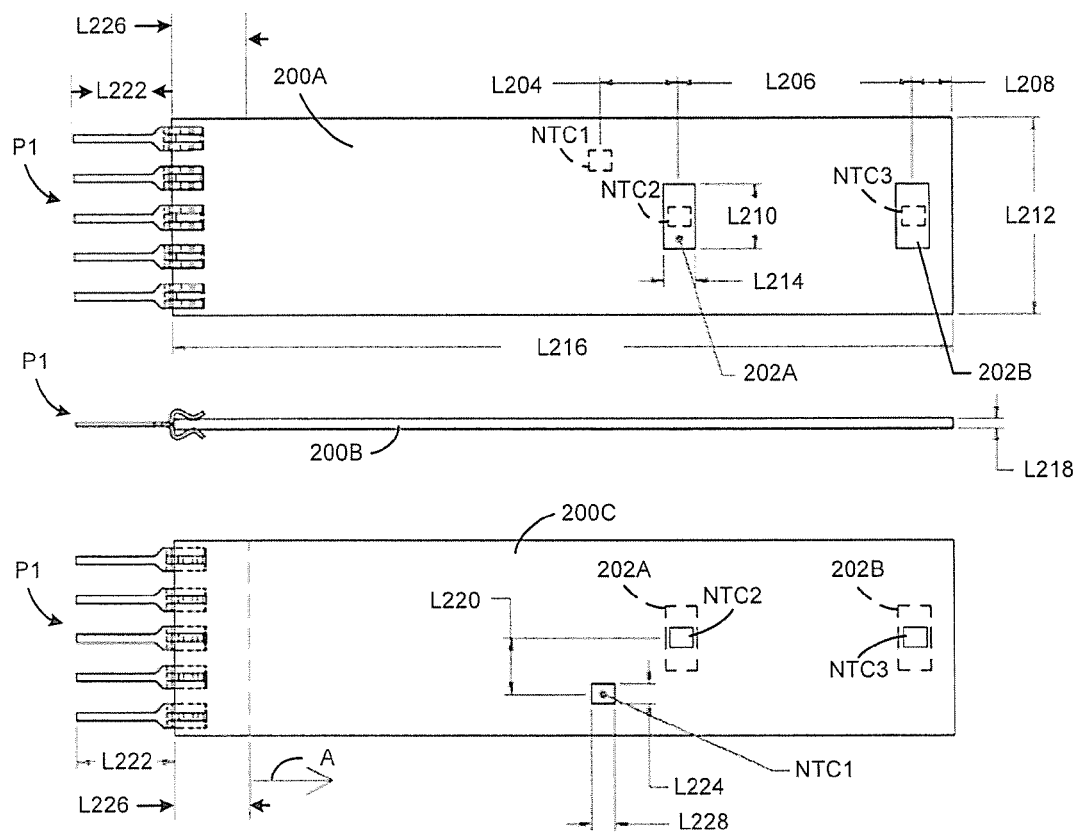
FIG. 3 is a plan view illustrating a layout of liquid level sensor on a ceramic substrate.

Turning now to FIG. 3, the ceramic substrate 200 with 5-pin interconnect P1 has heaters 202A and 202B arranged on a solder side 200A of the substrate according to the dimensions shown: L204; L206; L208; L210; L212; L214; and L216. As shown at 200B, the substrate 200 has a thickness L218. Located on an opposite side 200C of substrate 200 are thermistors NTC1, NTC2, and NTC3. The leads of interconnect P1 and the thermistors NTC1, NTC2, and NTC3 are arranged according to the dimensions shown: L220; L222; L224; and L228.

It should be noted that a suitable ceramic material for the substrate 200 is Coorstek's 96% $Al_2O_3$ ceramic or equivalent, and that a suitable NTC thermistor paste for the thermistors NTC1, NTC2 and NTC3 is Electro Science Laboratories' ESL-2115 or equivalent.

A protective coating covers the entirety of the side 200C and 200A of the substrate 200, except the portion defined by L226. The coating is electrically insulating and thermally conductive. The coating may comprise layer(s) of glaze and Parylene. Parylene, which has water shedding properties similar to Teflon, protects the ceramic substrate, and may be applied by vacuum deposition over the glaze.

In some embodiments, conductive pass-thrus (e.g., plated holes and/or "vias") (not shown) are formed by perforating the substrate 200 to allow for electrical communication between both sides of the substrate 200.

Figure 4:
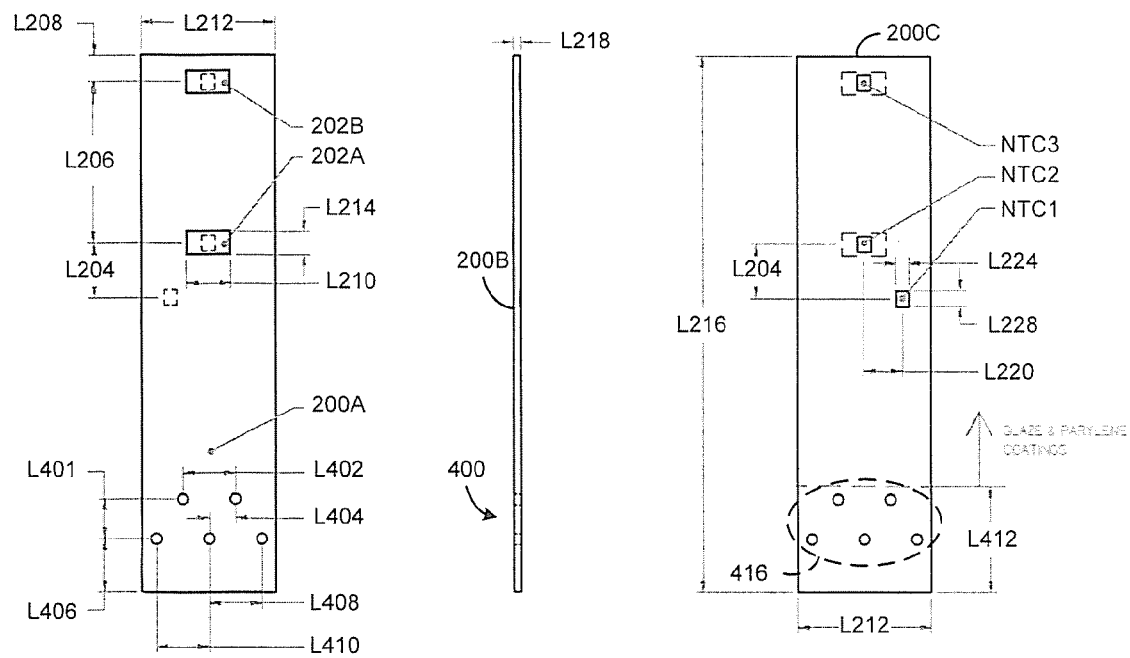
FIG. 4 is a plan view similar to FIG. 3, but illustrating an alternative embodiment of a liquid level sensor.

Turning now to FIG. 4, in an additional or alternative embodiment, the sensor substrate 200 is similar to the embodiment described above with reference to FIG. 3. In particular, heaters 202A and 202B are arranged on solder side 200A of the substrate 200 and thermistors NTC1, NTC2, and NTC3 are arranged on opposite side 200C of the substrate 200 according to the dimensions L204-L216, L220, L224, and L228. In addition, as shown at 200B, pass-thrus 400 are formed in the substrate 200 to enable electrical communication between both sides of the substrate 200. In particular, the pass-thrus 400 are arranged according to the dimensions shown: L401; L402; L404; L406; L408; and L410.

A protective coating is also applied to the substrate 200. One skilled in the art will readily appreciate that, given the arrangement of the pass-thrus 400 described above, the protective coating should be applied to a region of the substrate 200 in such a manner that the coating does not cover the pass-thrus 400. For example, the coating can be applied to the substrate 200 in order to avoid covering a pass-thru region 416 defined according to dimension L412.

Figure 5:
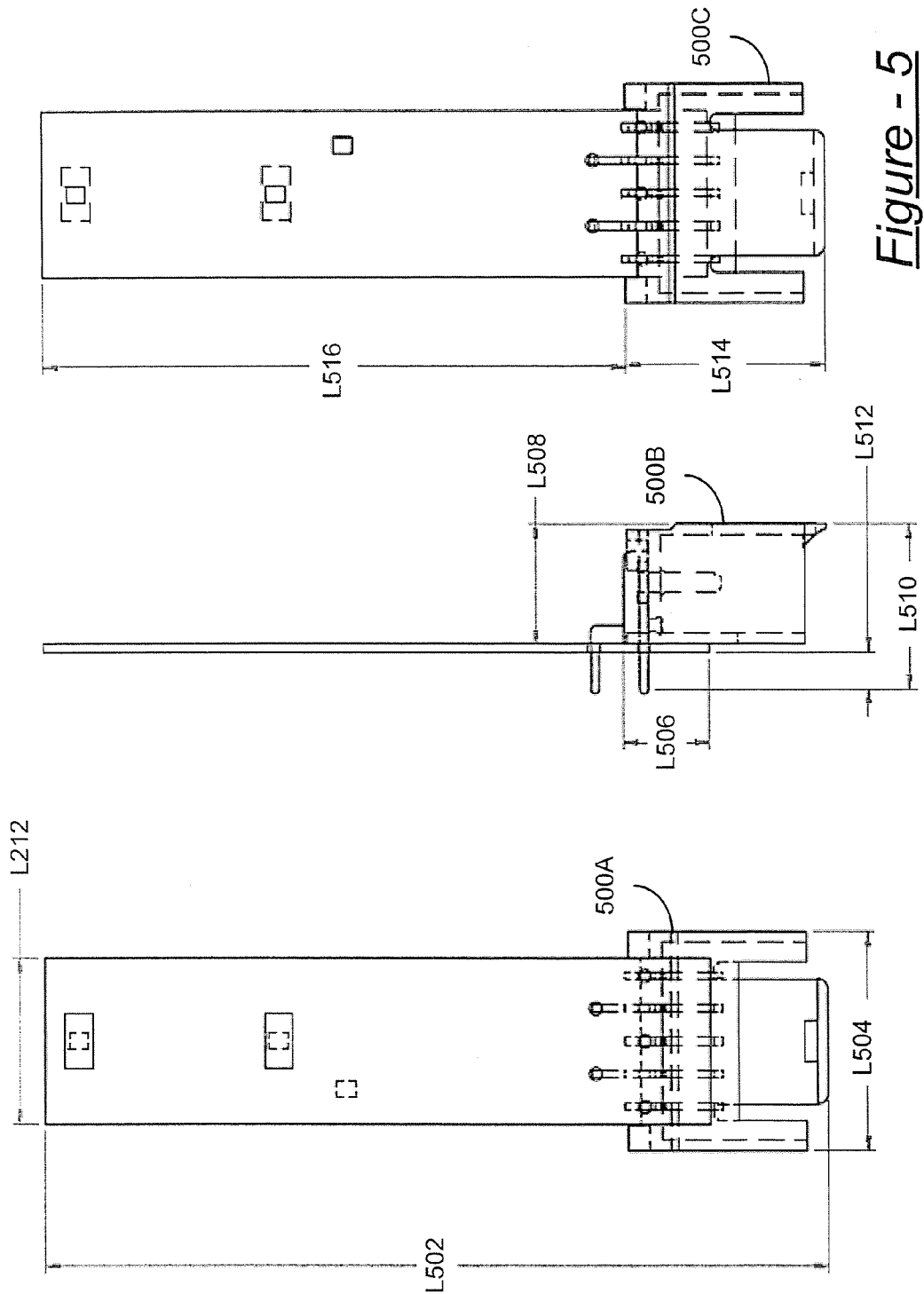
FIG. 5 is a plan view illustrating the liquid level sensor of FIG. 3 with a RAST connector subassembly.

Turning now to FIG. 5, the substrate 200 described above with reference to FIG. 4 is suitable for connection with a rigid (e.g., "RAST" standard) connector sub assembly 500A-C, which connects to the substrate through the pass-thrus 400. The resulting assembled substrate and connector system has the following dimensions: L212; L502; L504; L506; L508; L510; L512; L514; and L516. It should be noted that a suitable RAST connector is Molex's p/n 90861-1001.

Figure 6:
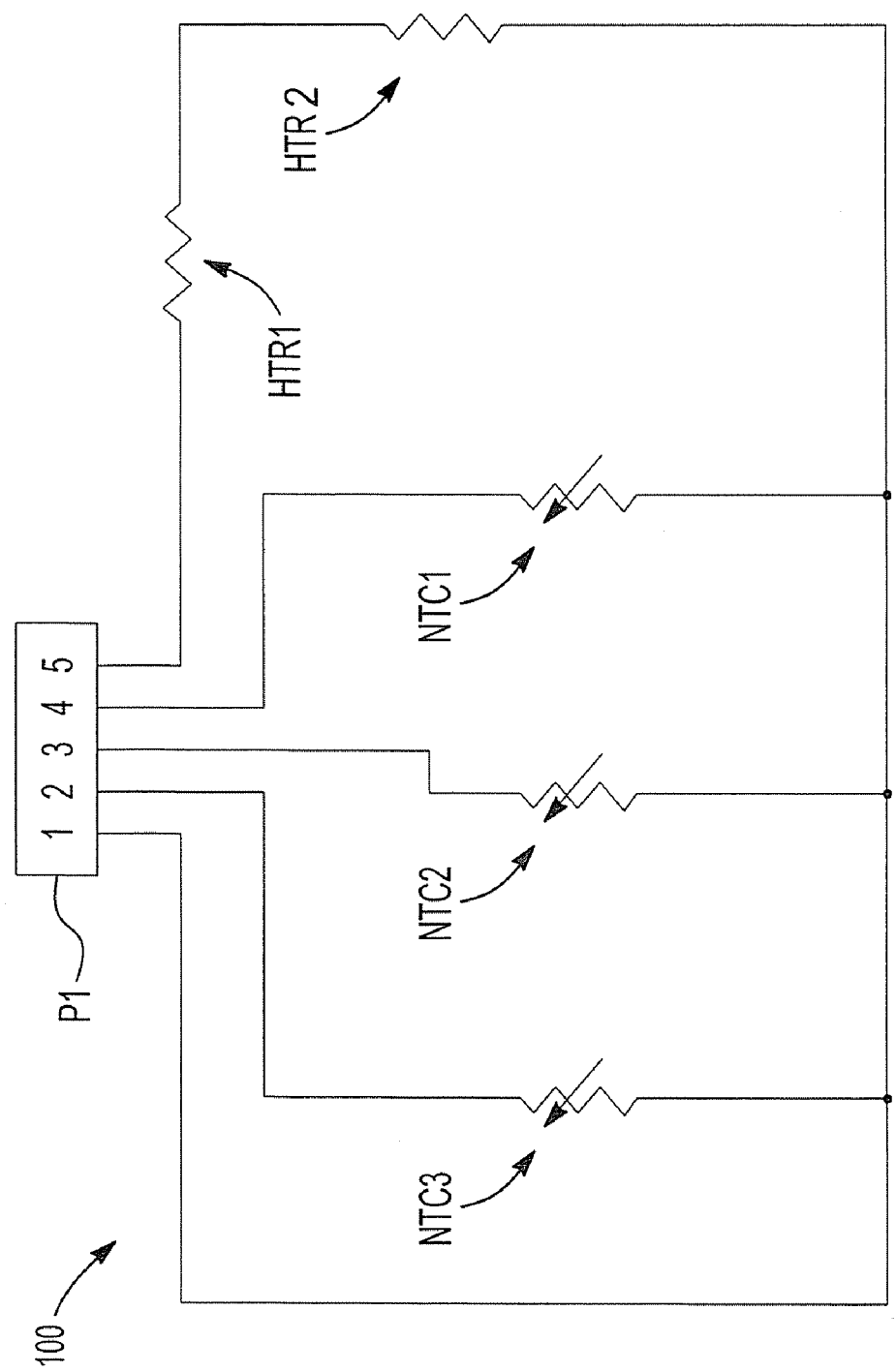
FIG. 6 is a circuit diagram illustrating an electrical circuit for a dual heater/thermistor pair liquid level sensor with ambient temperature sensor.

Referring now to FIG. 6, a liquid level sensor circuit 100 includes two heater/thermistor pairs. Circuit 100 also includes one ambient liquid temperature measuring thermistor NTC1. In some embodiments, the thermistors may use a screen-printable paste such as Electro Science Laboratories' ESL-2115 or equivalent. Alternately, NTC1-NTC3 could be discrete SMT components soldered to the substrate. The heater/thermistor pairs are composed in part of heaters, including heater HTR1 and heater HTR2, each of which can have a resistance of about fifty ohms (+/−1%). In some embodiments the heaters may use a screen-printable paste such as Sumitomo's R-U sr. or equivalent. Alternately, the heaters could be discrete SMT components soldered to the substrate. Heater HTR1 is positioned to operably heat a lower liquid temperature measuring threshold thermistor NTC2. Similarly, heater HTR2 is positioned to operably heat an upper liquid temperature measuring threshold thermistor NTC3. Each of the thermistors can have a resistance of about fifty kilo ohms (+/−2%). Five pins P1 are connected to the circuit components, with a series connection of the heaters being connected in parallel with each of the thermistors.

In operation, sensed readings from the thermistors are compared to assess liquid level. If the liquid level is too high or too low, then the readings from the thermistors are all the same. The reading from thermistor NTC1 can be compared to either or both of the readings from the other thermistors NTC2 and NTC3.

Figure 7:
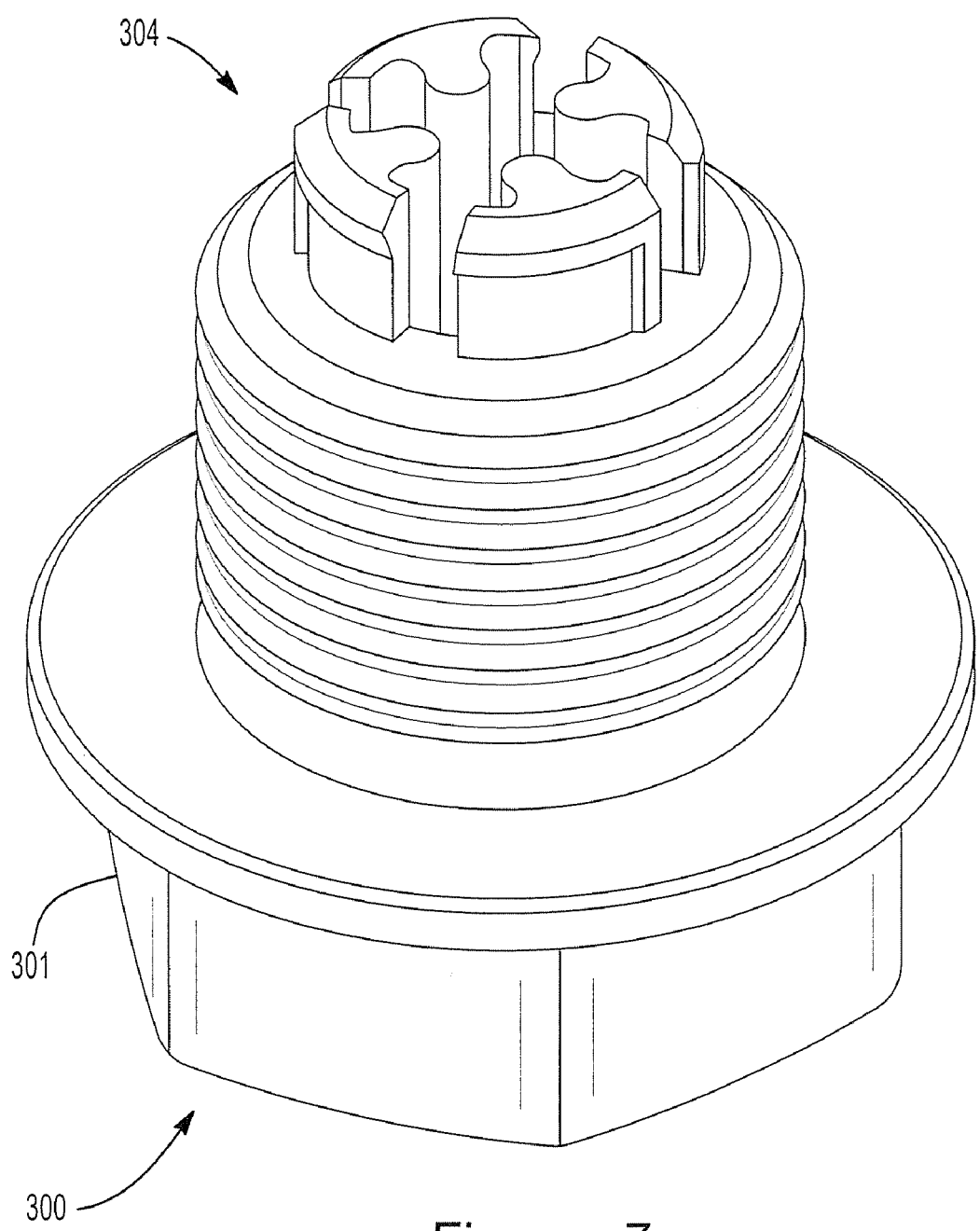
FIG. 7 is a perspective view of a base of a liquid level sensor probe switch case.

Turning now to FIG. 7, the switch case base 300 is shown in greater detail. The switch case base 300 provides a receptacle into which the circuit board and connector assembly 201 can be installed. The switch case base 300 generally comprises a polygonal portion 301, a threaded portion 304 and an O-ring (FIG. 2). It should be noted that a suitable material for the switch case is Chevron-Phillips' Ryton R-4-220 BLK or equivalent.

Figure 8:
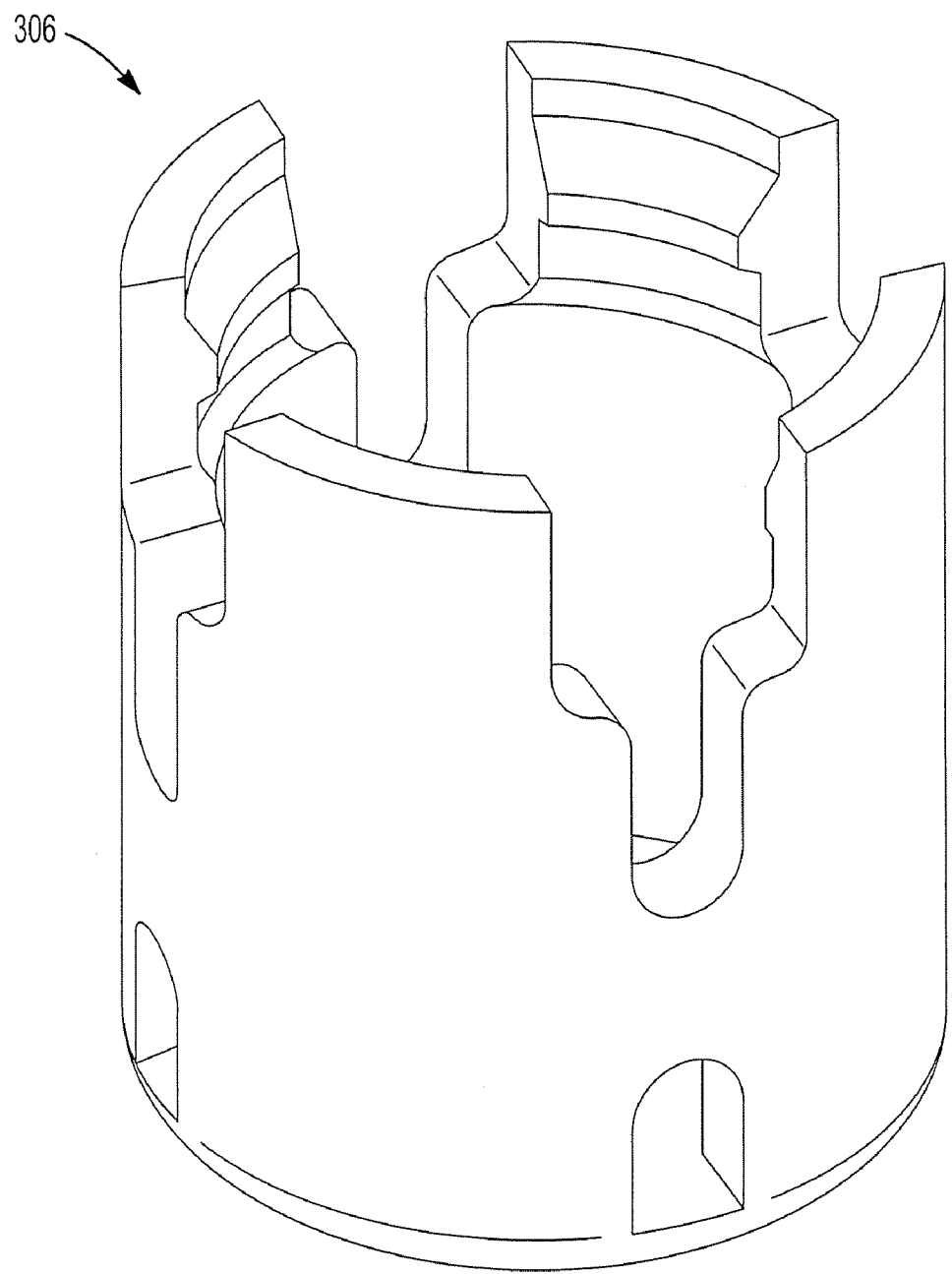
FIG. 8 is a perspective view of a cap of a liquid level sensor probe switch case.

Turning now to FIG. 8, the liquid level sensor cap 306 is shown. It should be noted that a suitable material for the cap is Chevron-Phillips' Ryton R-4-220 BLK or equivalent.

Figure 9:
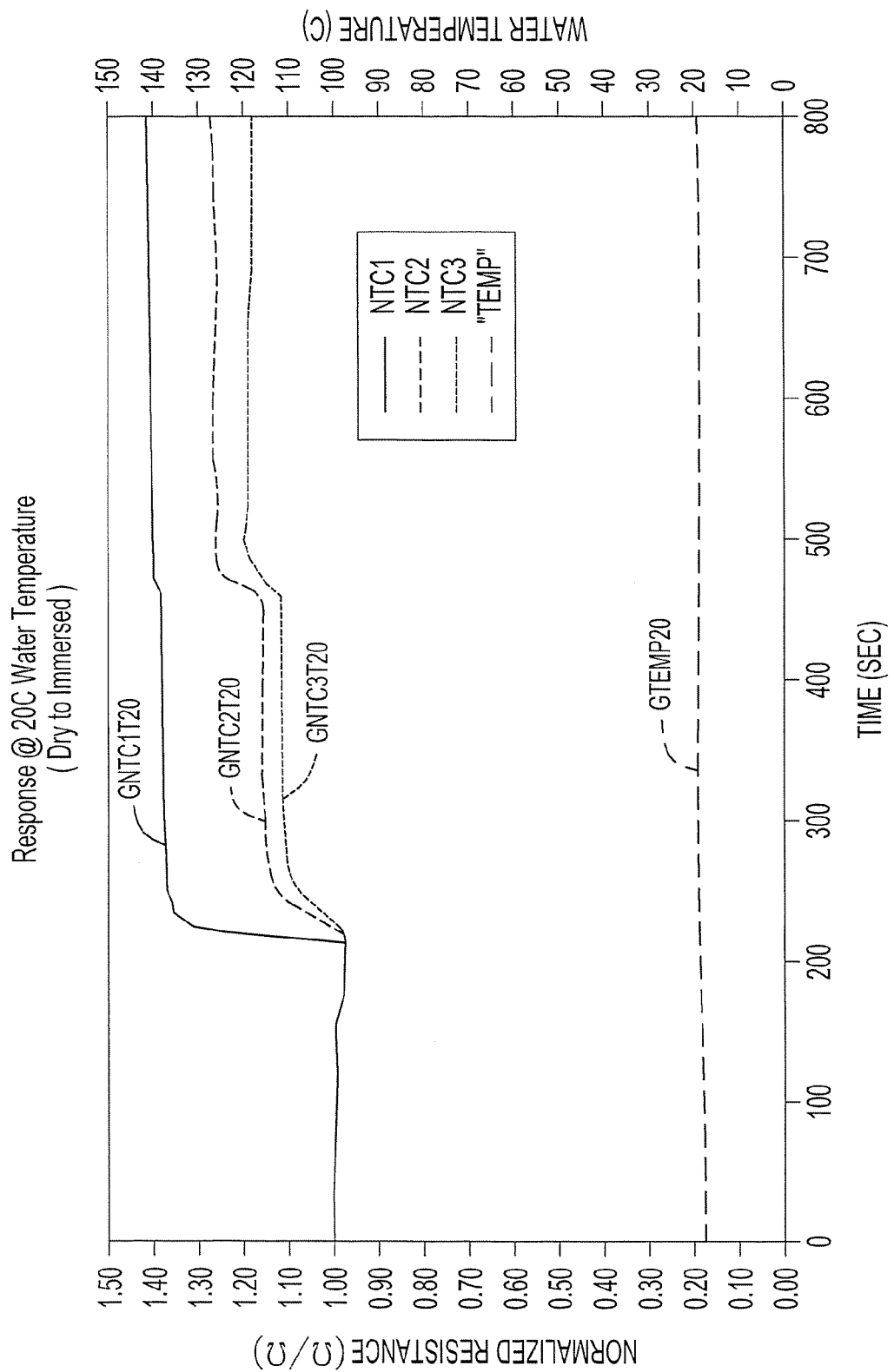
FIG. 9 is a graphical representation illustrating liquid level sensor response at twenty degrees Celsius liquid temperature.
Figure 10:
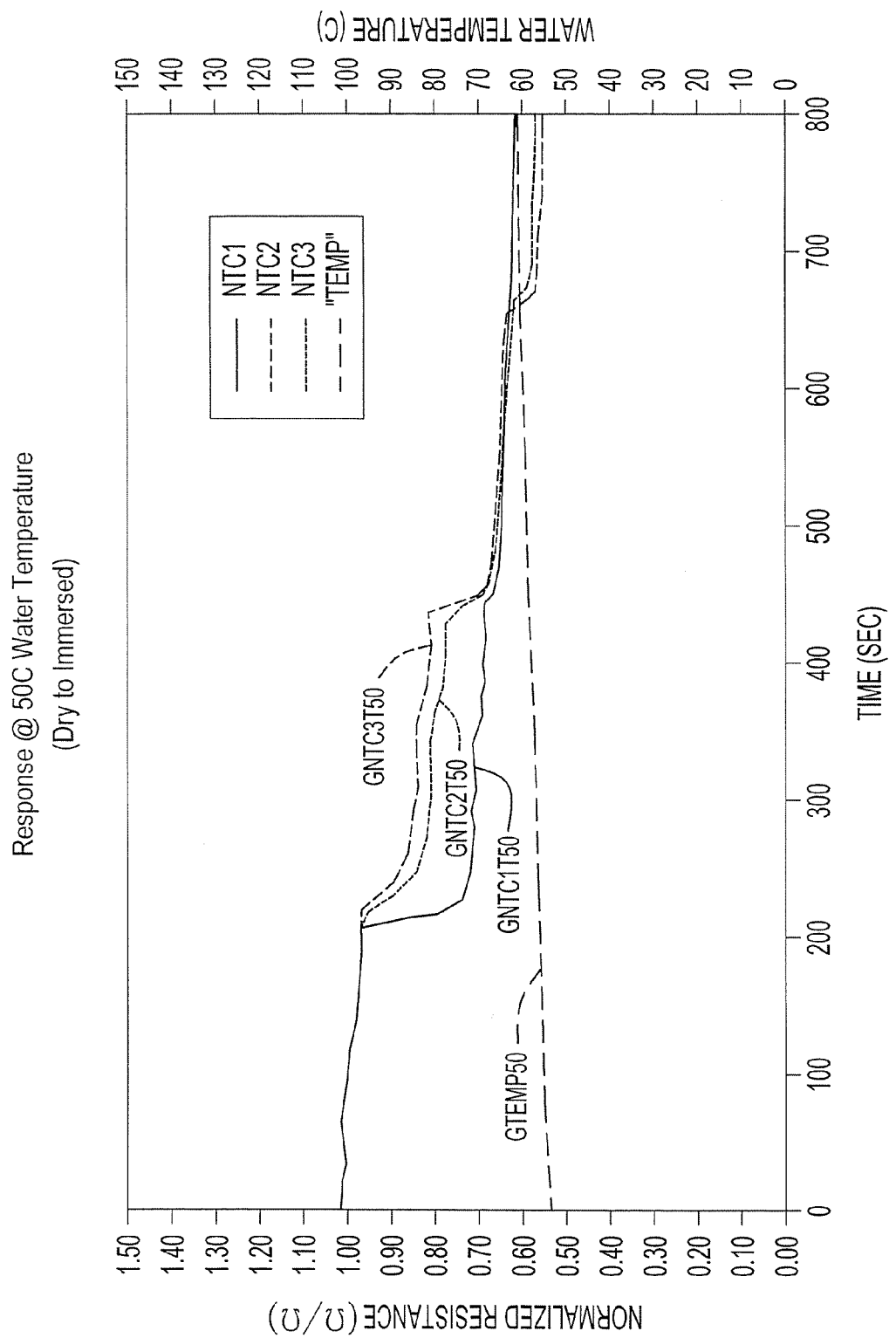
FIG. 10 is a graphical representation illustrating liquid level sensor response at fifty degrees Celsius liquid temperature.
Figure 11:
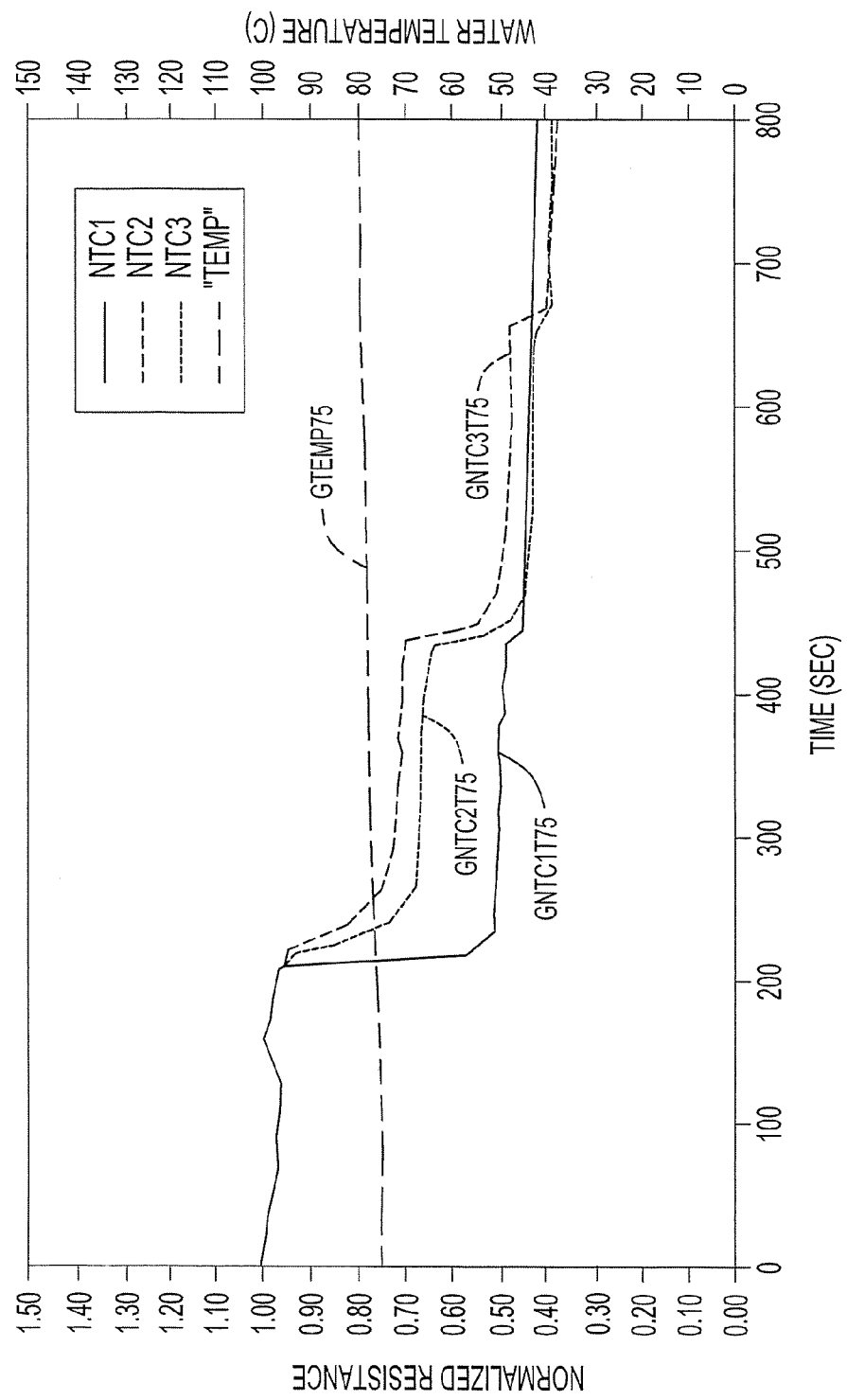
FIG. 11 is a graphical representation illustrating liquid level sensor response at seventy-five degrees Celsius liquid temperature.

Turning next to FIGS. 9-11, the normalized resistances of the thermistors can be observed to change over time as a tank in which the liquid level sensor is installed is filled with liquid. With particular reference to FIG. 9, with the liquid temperature GTEMP20 at approximately 20° C., the normalized resistances of the thermistors are equal when the tank is dry and the heaters have been energized long enough for the substrate to reach a steady state temperature. As the tank is filled with liquid, the normalized resistance GNTC1T20 measured with the reference thermistor, the normalized resistance GNTC2T20 measured with the lower threshold thermistor, and the normalized resistance GNTC3T20 measured with the upper threshold thermistor all begin to rise as those thermistors become immersed. Since the reference thermistor is installed at a lowest point in the tank, it becomes immersed first, and its normalized resistance GNTC1T20 begins to rise first. Then, the lower threshold thermistor becomes immersed, followed by the upper threshold thermistor. It should be noted that the upper and lower threshold thermistors are heated by the heaters to a temperature above the temperature of the liquid, so their normalized resistances do not rise to match that of the reference thermistor when the tank is full.

Referring now generally to FIGS. 10 and 11, the normalized resistances fall instead of rising when the temperature of the liquid is significantly higher than 20° C. For example, with the liquid temperature GTEMP50 at approximately 50°

C., the normalized resistances GNTC1T50, GNTC2T50, and GNTC3T50 decrease as the tank fills. As another example, with the liquid temperature GTEMP75 at approximately 75° C., the normalized resistances GNTC1T75, GNTC2T75, and GNTC3T75 decrease as the liquid fills the tank. In each of these examples, since the heat of the liquid is high and complements the heat provided by the heaters, the normalized resistances measured by the threshold thermistors fall to match or even fall below the normalized resistance measured by the reference thermistor.

With knowledge of sensor probe behavior under operation conditions, an end user of the liquid level sensor probe can design their system in which the sensor probe is installed according the needs of the application in question. In particular, a control module 54 (FIG. 1) for use with the probe 52 can determine whether liquid level is too high or too low by comparing the sensed readings from the thermistors. In particular, the reading from thermistor NTC1 (FIG. 3) can be compared to either or both of the readings from the other thermistors NTC2 and NTC3. For example, if the liquid level is too high or too low, then the readings from the thermistors are all the same. Therefore, the output from the control module 54 (FIG. 1) can be binary in nature, indicating whether the liquid in the container is: (1) either too high or too low; versus (2) neither too high nor too low. This output can be provided to another module that controls filling and emptying of liquid in the container. This other module can then combine this information with its own a priori knowledge regarding whether the container is in the process of being filled or in the process of being emptied to determine whether to begin filling, stop filling, begin emptying, or stop emptying the tank. Alternatively or additionally, control module 54 can receive the knowledge about the current container filling mode, perform the combination, and output a trinary signal indicating whether container is empty, full, or in between. Alternatively or additionally, module 54 can output a quaternary signal indicating whether the container is full, empty, partially filled and still filling, or partially empty and still emptying. Further, control module 54 can alternatively or additionally be capable of deciding whether to fill or empty the container by receiving input from a user and/or executing an automated tank filling and/or emptying process. In this case, control module 54 can output a signal controlling one or more valves or other machinery for filling the liquid container in which the probe 52 is installed. Moreover, control module 54 can take temperature of the liquid into account when interpreting the signals from the thermistors. With test data on hand, the temperature of the liquid can be estimated by the signal from the reference thermistor when the container is full. Alternatively or additionally, a priori knowledge of the temperature can be applied.

Figure 12A:
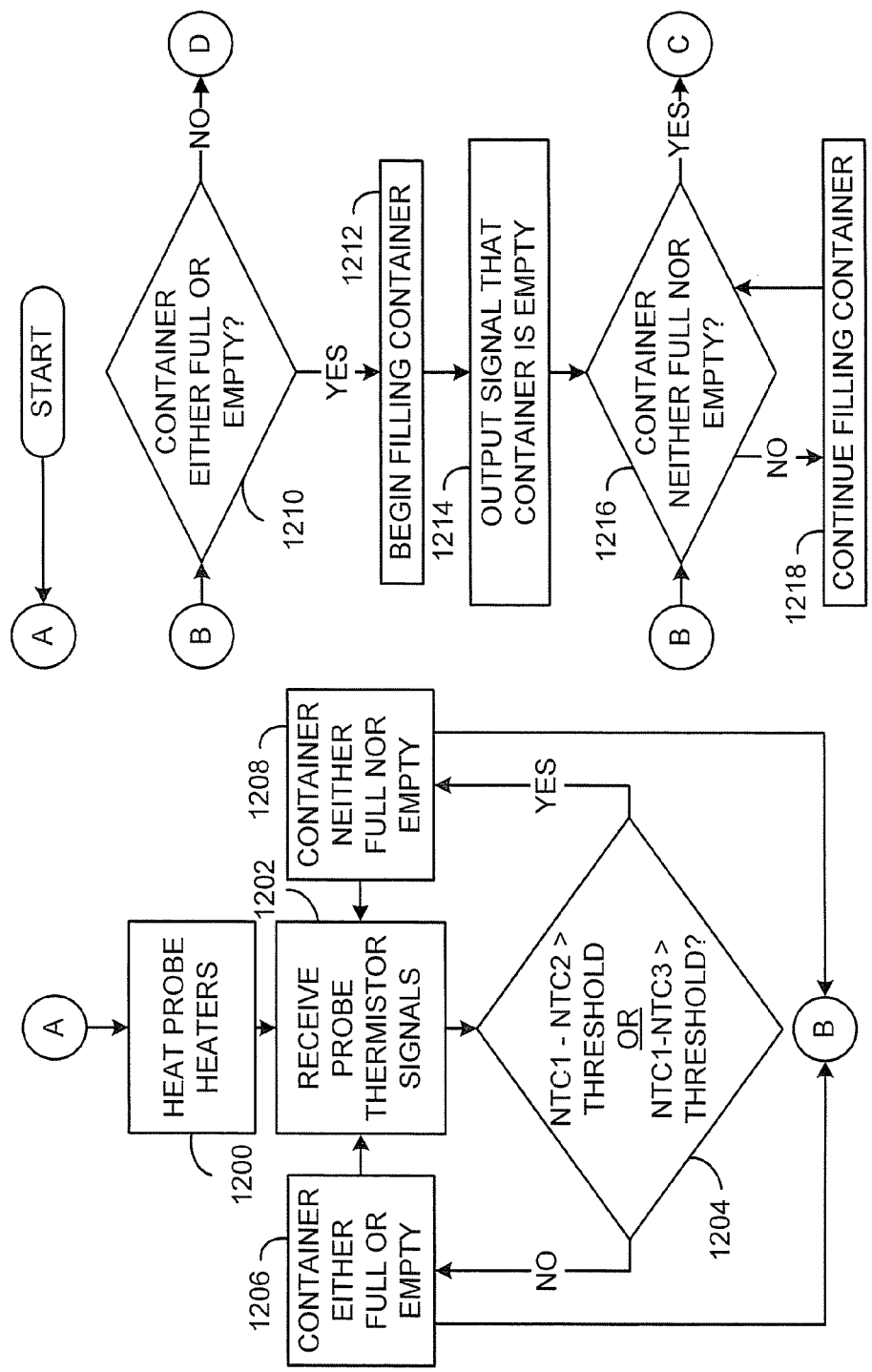
FIG. 12 is a set of flow diagrams, including FIGS. 12A, 12B, and 12C, illustrating a method of operation for a liquid level sensor.
Figure 12B:
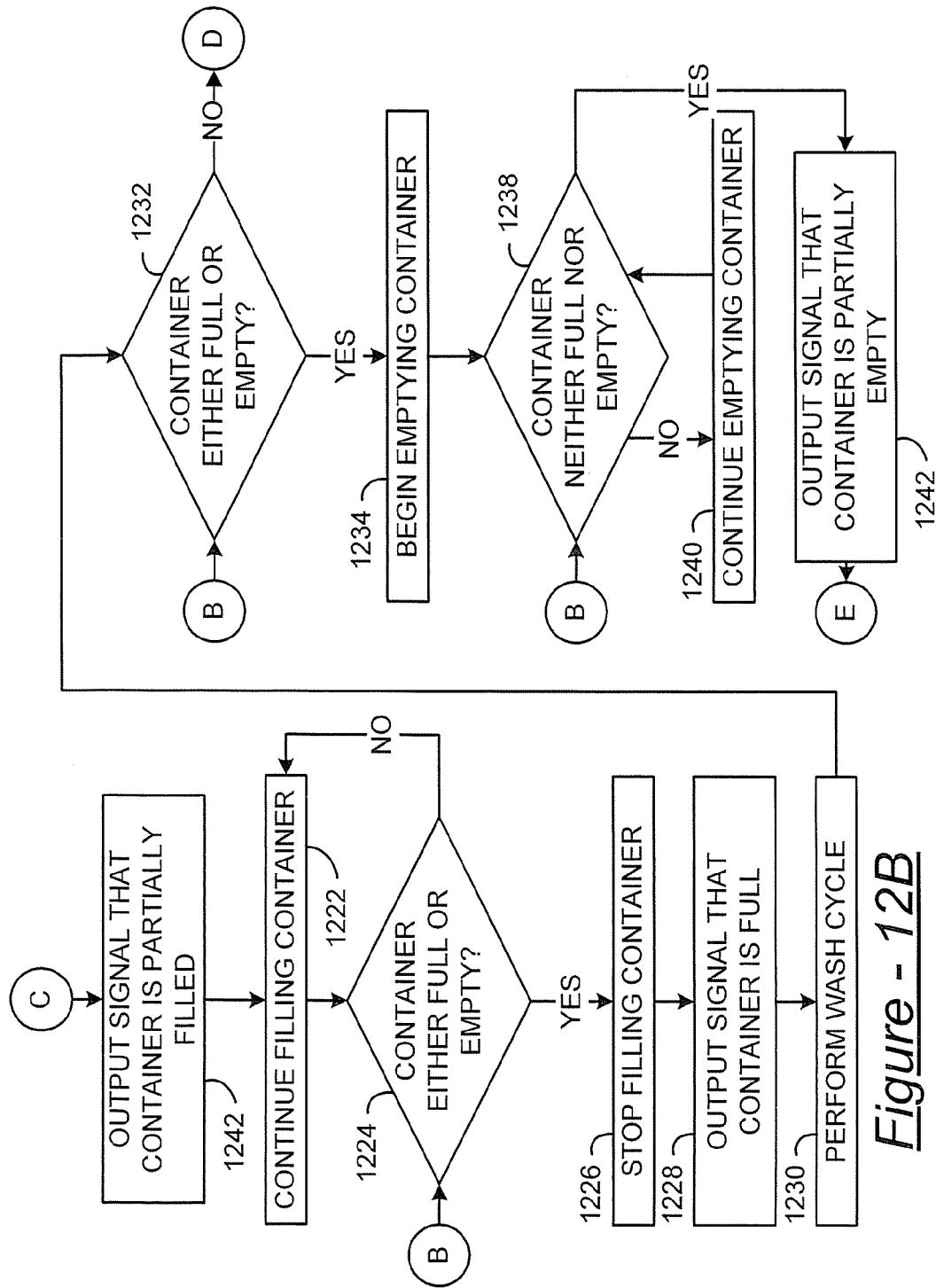
Figure 12C:
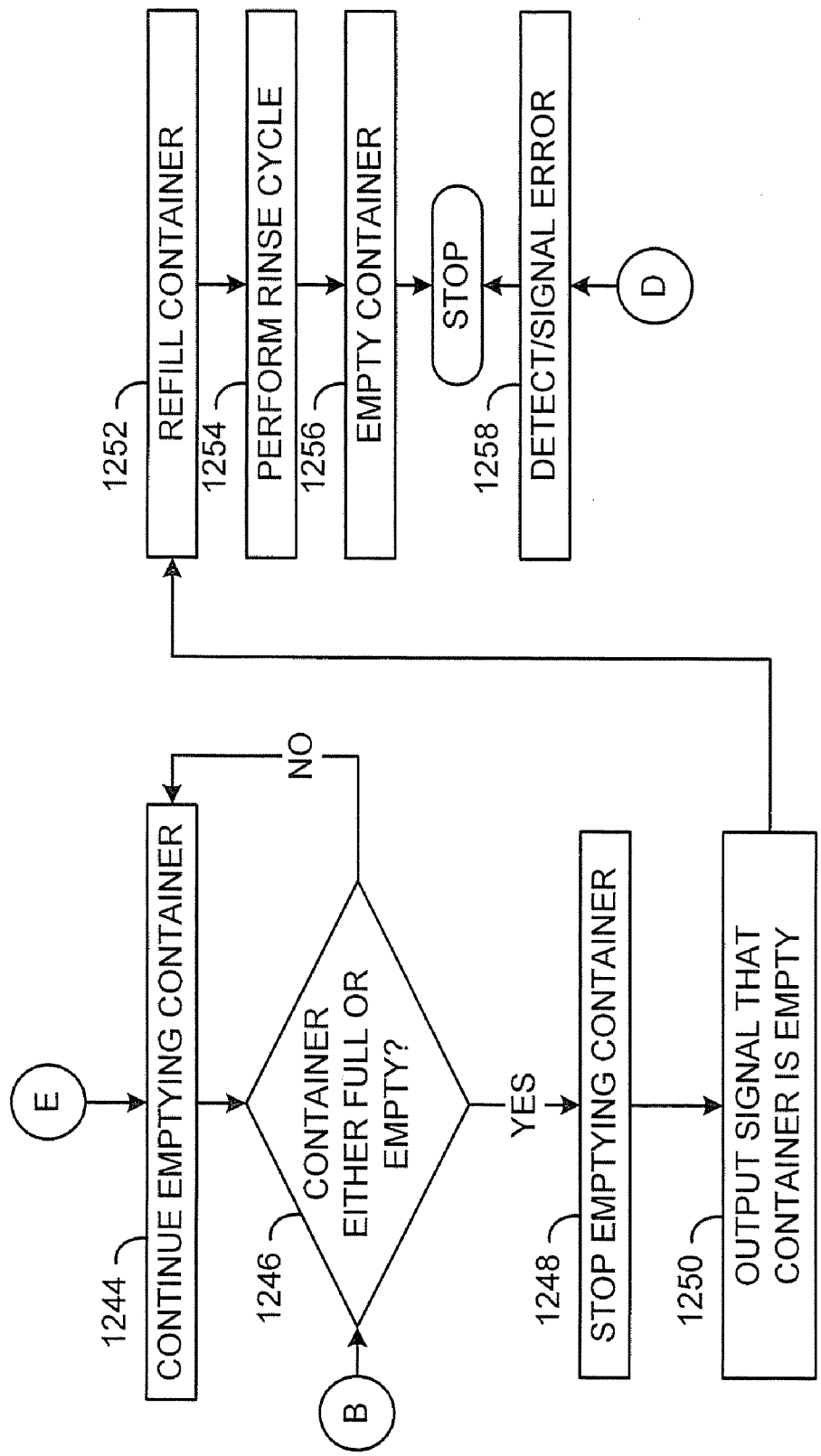

Turning finally to FIG. 12, and referring generally to FIGS. 12A, 12B, and 12C, a method of operation for a liquid level sensor begins by heating heaters of the probe at step 1200 and receiving signals from thermistors of the probe at step 1202. Then, at decision step 1204, the signal from the reference thermistor is compared to each of the signals from the threshold thermistors, and the results (e.g., absolute values) compared to a threshold. It should be readily understood that different thresholds can be employed for different liquid temperatures. It should also be readily understood that approximate liquid temperature can be known in some cases (e.g., washing machines) based on whether a cold cycle or hot cycle is being administered. In any event, decision step 1204 makes a determination whether the container is either full or empty at 1206, versus neither full nor empty at 1208. This determination occurs continuously, resulting in a binary signal and/or output indicating whether the container is partially filled, or else one of full or empty.

In the case of a washing machine, this binary signal can be acted upon at decision step 1210 to determine whether to begin filling the container at step 1212, or else detect/signal an error at step 1258 and cease operation. Ceasing operation can occur on the basis that the container is detected to be partially filled with liquid at the beginning of the washing operation, and thus avoids overflow. Once the container begins to be filled with liquid at step 1212, then a signal can be output at step 1214 to indicate that the container is empty. Then, at decision step 1216, the container is detected to be neither full nor empty when the signals from the thermistors have diverged significantly. Accordingly, the container continues to be filled with liquid at step 1218 until this significant divergence has taken place.

Once the container is detected to be partially filled, a signal can be output to indicate this state at step 1242. Then, the container continues to be filled at step 1222 until the container is detected to be either full or empty at decision step 1224. At this point, the container is full, and a signal can be output to indicate this state at step 1228. Next, at step 1230, a wash cycle can be performed that involves operation of an agitator. Thereafter, an emptying process begins by once more attempting to detect that the container is full or empty at decision step 1232. If so, then emptying of the container is begun at step 1234. Otherwise, an error is detected and/or signaled at step 1258, and the process ends.

Once the container begins to be emptied, the container continues to be emptied at step 1240 until it is determined at decision step 1238 that the container is neither full nor empty. A signal can then be output to indicate that the container is partially empty, and this signal can be different from the signal output at step 1242 to distinguish whether the container is filling or emptying.

Once the container is partially empty, the container continues to be emptied at step 1244 until a determination is made at decision step 1246 that the container is once again either full or empty. At this point, emptying of the container ceases, and a signal can be output to indicate that the container is empty at step 1250. Thereafter, the aforementioned steps can be repeated to refill the container at step 1252, perform a rinse cycle at step 1254, and empty the container at step 1256.

While the process described above particularly references a washing machine application, it should be readily understood that this same process can be applied in various ways, such as filling and/or emptying a gas tank of a vehicle, filling and or emptying a swimming pool or hot tub, or any other filling or emptying process. Moreover, portions of the process described above can be used to monitor but not control liquid level in any container of liquid, whether man made or natural. Thus, while it will be appreciated that the preferred embodiments of the invention disclosed are well calculated to provide the advantages and features above stated, it will be appreciated that the invention is susceptible to modification, variation and change without departing from the proper scope or fair meaning of the subjoined claims.

We claim:

1. A liquid level sensor, comprising:
   a ceramic substrate;
   at least two discrete thermistor/heater pairs attached to said substrate, each thermistor/heater pair arranged to be one above the other when said sensor is operably installed in a liquid container;
   at least one reference thermistor attached to said substrate and arranged to be below said thermistor/heater pairs when said sensor is operably installed in the liquid container, wherein said reference thermistor is attached to said substrate in a region lacking proximity to any heaters;

one or more protective coatings applied to said substrate, wherein said protective coatings include a polymer layer applied over an inert glass layer; and a control module for receiving signals from the thermistors in order to determine at least whether the container is full or empty versus partially filled or partially empty;

wherein heaters of said thermistor/heater pairs are electrically connected in parallel to form a parallel connection, and said parallel connection is connected in parallel with each thermistor of said thermistor/heater pairs and with said reference thermistor.

2. The sensor of claim 1, wherein said probe further has a protective base into which said substrate is inserted, epoxy fixing said substrate within said protective base, and a slosh shield attached to said base over said substrate wherein said protective base is operable to facilitate installation of said sensor probe into a liquid container.

3. The sensor of claim 2, wherein said protective base is operable to facilitate installation of said sensor probe into a liquid container in one of a vertical or horizontal orientation.

4. The sensor of claim 1, wherein at least three thermistors attached to said substrate, including only said temperature reference thermistor, a lower temperature threshold thermistor, and an upper temperature threshold thermistor, have identical resistances, and heaters attached to said substrate have identical resistances.

5. The sensor of claim 1, wherein said control module is adapted to compare a signal from said reference thermistor to each signal from said threshold thermistors, and further compare results of those comparisons to a threshold in order to determine whether the container is full or empty versus partially filled or empty.

6. The sensor of claim 1, wherein said control module fills said container until a determination is made that the container is at least one of partially filled or partially empty, and continues to fill said container until a determination is made that the container is at least one of full or empty.

7. The sensor of claim 1, wherein said control module empties said container until a determination is made that the container is at least one of partially filled or partially empty, and continues to empty said container until a determination is made that the container is at least one of full or empty.

8. The sensor of claim 1, wherein said control module ceases filling or emptying of said container when said container is determined to have a liquid level that conflicts with expectations.

9. The sensor probe of claim 1, wherein at least one thermistor/heater pair is arranged with a thermistor of said thermistor/heater pair attached on one side of said substrate, and a heater of said pair attached on another side of said substrate in a position causing it to operably heat said thermistor.

10. A liquid level sensor for a liquid container, comprising:
a ceramic substrate upon which are included at least two discrete thermistor/heater pairs and a reference thermistor, the heaters of said thermistor/heater pairs being electrically connected in parallel to one another, and in parallel with the thermistors;

the thermistor/heater pairs being located on the substrate such that one pair is above another pair when the sensor is operably installed in the liquid container;

the reference thermistor being located on the substrate below the thermistor/heater pairs when said sensor is operably installed in the liquid container and in a manner such that the heaters of the thermistor/heater pairs cannot heat the reference thermistor; and a control module communicating with the thermistors and determining the fill state of the liquid container.

* * * * *

UNITED STATES PATENT AND TRADEMARK OFFICE
CERTIFICATE OF CORRECTION

PATENT NO.       : 7,596,998 B2                                          Page 1 of 1
APPLICATION NO. : 11/489249
DATED            : October 6, 2009
INVENTOR(S)      : Zimmermann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 408 days.

Signed and Sealed this

Twenty-eighth Day of September, 2010

David J. Kappos
*Director of the United States Patent and Trademark Office*